US012335698B2

(12) United States Patent
Zheng et al.

(10) Patent No.: US 12,335,698 B2
(45) Date of Patent: Jun. 17, 2025

(54) AUDIO DENOISING METHOD AND SYSTEM

(71) Applicant: Shenzhen Shokz Co., Ltd., Shenzhen (CN)

(72) Inventors: Jinbo Zheng, Shenzhen (CN); Meilin Zhou, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 235 days.

(21) Appl. No.: 18/135,101

(22) Filed: Apr. 14, 2023

(65) Prior Publication Data

US 2023/0262390 A1 Aug. 17, 2023

Related U.S. Application Data

(63) Continuation of application No. PCT/CN2020/140214, filed on Dec. 28, 2020.

(51) Int. Cl.
*H04R 3/04* (2006.01)

(52) U.S. Cl.
CPC .................................... *H04R 3/04* (2013.01)

(58) Field of Classification Search
CPC ....... G10L 21/02; G10L 25/84; H04R 1/1083; H04R 2410/05
See application file for complete search history.

(56) References Cited

U.S. PATENT DOCUMENTS

| | | | | |
|---|---|---|---|---|
| 6,766,292 | B1 | 7/2004 | Chandran et al. | |
| 10,636,434 | B1 * | 4/2020 | Ramprashad | G10L 25/84 |
| 2009/0119111 | A1 | 5/2009 | Goto et al. | |

(Continued)

FOREIGN PATENT DOCUMENTS

| | | | |
|---|---|---|---|
| CN | 104103278 | A | 10/2014 |
| CN | 105810203 | A | 7/2016 |

(Continued)

OTHER PUBLICATIONS

International Search Report of PCT/CN2020/140214 (Sep. 28, 2021).

(Continued)

*Primary Examiner* — James K Mooney
(74) *Attorney, Agent, or Firm* — Fideli Law PLLC; Qiang Li

(57) ABSTRACT

In an audio denoising method and system provided in the present disclosure, a gain coefficient corresponding to each frequency unit may be generated based on a parameter related to a frequency by using a frequency of an audio signal as a unit, and gain processing is performed on each frequency unit separately by using the gain coefficient. The gain coefficient corresponding to a frequency unit including more valid audio signals may be larger, and a gain coefficient corresponding to a frequency unit including fewer valid audio signals may be smaller, so that more audio signals corresponding to frequency parts including more valid audio signals are preserved, while less audio signals corresponding to frequency parts including fewer valid audio signals are preserved. In this way, fidelity and intelligibility of an audio signal are improved while quality of the audio signal is improved and noise is reduced.

20 Claims, 4 Drawing Sheets

P100

(56) References Cited

U.S. PATENT DOCUMENTS

| | | | |
|---|---|---|---|
| 2011/0081026 A1 | 4/2011 | Ramakrishnan et al. | |
| 2011/0191101 A1* | 8/2011 | Uhle .................. | G10L 21/0208 704/205 |
| 2016/0042746 A1 | 2/2016 | Fujieda | |
| 2017/0345439 A1 | 11/2017 | Jensen et al. | |

FOREIGN PATENT DOCUMENTS

| | | | |
|---|---|---|---|
| CN | 107910011 | A | 4/2018 |
| CN | 108630221 | A | 10/2018 |
| CN | 109686347 | A | 4/2019 |
| CN | 110634497 | A | 12/2019 |
| CN | 111131947 | A | 5/2020 |
| CN | 111554321 | A | 8/2020 |
| CN | 111627455 | A | 9/2020 |
| EP | 2149985 | A | 2/2010 |
| JP | 2000-047697 | A | 2/2000 |
| JP | 2011259319 | A | 12/2011 |
| JP | 2016-038551 | A | 3/2016 |
| TW | 1609366 | B | 12/2017 |
| WO | 2007052612 | A1 | 5/2007 |
| WO | 2019112468 | A | 6/2019 |
| WO | 2019112468 | A1 | 6/2019 |
| WO | 2019210605 | A1 | 11/2019 |

OTHER PUBLICATIONS

Jurgen Tchorz et al., 'SNR Estimation Based on Amplitude Modulation Analysis With Applications to Noise Suppression', IEEE Transactions on Speech and Audio Processing, vol. 11, No. 3, May 2003.

Matthias Dorbecker et al., 'Combination of TwoChannel Spectral Subtraction and daptive Wener PostFiltering for Noise Reduction and reverberation', EUSIPCO 1996, Sep. 1996.

Furuta et al. "A Study of Noise Suppression Method Based on Mutual Control of Spectral Subtraction and Spectral Amplitude Suppression," IEICE Transactions on Information and Systems, Pt. 2, vol. JB7-D-2, Feb. 1, 2004, pp. 464-474.

Matthias Dorbecker et al., 'Combination of TwoChannel Spectral Subtraction and daptive Wiener PostFiltering for Noise Reduction and reverberation', EUSIPCO 1996, Sep. 1996.

Yumie Ono, "Back to Basics: Digital Signal Processing", Biomedical Engineering, vol. 57, Nos. 2-3. Jun. 2019.

Szu-Chen Jou et al., "Adaptation for Soft Whisper Recognition Using a Throat Microphone", Interspeech 2004—ICSLP. Oct. 2004.

* cited by examiner

AUDIO DENOISING METHOD AND SYSTEM

RELATED APPLICATIONS

This application is a continuation application of PCT application No. PCT/CN2020/140214, filed on Dec. 28, 2020, and the content of which is incorporated herein by reference in its entirety.

TECHNICAL FIELD

The present disclosure relates to the audio signal processing field, and in particular, to an audio denoising method and system.

BACKGROUND

In many life scenarios, people are surrounded by noise, and need to perform voice enhancement to have better auditory experience. The voice enhancement may also be referred to as noise suppression, which means to reduce or suppress noise to some extent, so as to improve the quality, intelligibility, and the like of a voice surrounded by noise. In a conventional method, generally, an obtaining device of a signal source is an air-conduction component, that is, an air-conduction microphone. In a high noise scenario, a valid audio signal obtained by the air-conduction microphone is almost completely surrounded by noise.

Currently, a bone-conduction microphone is used on an electronic product such as a headphone, and there are more and more applications using bone-conduction microphones to receive voice signals. In many electronic devices, an air-conduction microphone and a bone-conduction microphone having different features are combined, the air-conduction microphone is used to pick an external audio signal, the bone-conduction microphone is used to pick a vibration signal of a sound generation part, and voice enhancement processing and fusion are performed on the picked signals. Different from an air-conduction microphone, a bone-conduction component may directly pick a vibration signal of a sound generation part, which can reduce the impact of ambient noise to some extent. In solutions combining an air-conduction microphone and a bone-conduction microphone, there may be a solution with a plurality of air-conduction microphones and one bone-conduction microphone, and there may be a solution with one air-conduction microphone and one bone-conduction microphone. In a high noise scenario, voice quality of a single air-conduction microphone is poor, and voice quality of a bone-conduction microphone is also polluted by external noise to some extent.

Currently, for noise suppression, there are various denoising algorithms, for example, a single-microphone denoising algorithm, such as a spectral subtraction method or a Wiener filtering method, and a microphone array denoising algorithm, such as a fixed beamforming method or an adaptive beamforming method. In a high noise scenario, single-microphone denoising becomes very difficult, and a conventional denoising algorithm such as spectral subtraction or Wiener filtering has a very limited effect on increasing a signal-to-noise ratio (which means denoising strength is insufficient); and some improved algorithms increase denoising strength but cause great voice distortion, and there may be an obvious noise residue in a high-frequency part. How to further improve, on a basis of the conventional audio denoising algorithm, voice quality of an air-conduction microphone signal, a bone-conduction microphone signal, or an audio signal obtained after fusion of an air-conduction microphone signal and a bone-conduction microphone signal, is a problem that urgently needs to be resolved.

Therefore, a new audio denoising method and system is needed for preserving voice fidelity and intelligibility while filtering noise and increasing a signal-to-noise ratio in a high noise scenario.

SUMMARY

The present disclosure provides a new audio denoising method and system to preserve voice fidelity and intelligibility while filtering noise and increasing a signal-to-noise ratio in a high noise scenario.

According to a first aspect, the present disclosure provides an audio denoising system, including: at least one storage medium storing at least one set of instruction for audio denoising; and at least one processor in communication with the at least one storage medium, where during operation, the at least one processor executes the set of instructions to: obtain at least one modulation parameter related to a frequency of a to-be-processed audio signal, and perform gain processing on the to-be-processed audio signal based on at least one gain coefficient corresponding to the at least one modulation parameter to obtain a target audio signal.

According to a second aspect, the present disclosure provides an audio denoising method, including: obtaining at least one modulation parameter related to a frequency of a to-be-processed audio signal; and performing gain processing on the to-be-processed audio signal based on at least one gain coefficient corresponding to the at least one modulation parameter to obtain a target audio signal, where the at least one modulation parameter includes at least one of: a plurality of frequency units of the to-be-processed audio signal, or a plurality of signal-to-noise ratios corresponding to the plurality of frequency units.

As may be known from the foregoing technical solutions, in the audio denoising method and system provided in the present disclosure, optimization processing may be further performed on an audio signal on a basis of a conventional audio denoising method by using a frequency as a unit. In the method and system, gain processing may be performed on the audio signal based on at least one of a plurality of frequency units of the audio signal or signal-to-noise ratios corresponding to the plurality of frequency units. In the method and system, a gain coefficient may be generated based on the plurality of frequency units of the audio signal and the signal-to-noise ratios corresponding to the plurality of frequency units, and gain processing is performed on the audio signal by using the gain coefficient. The higher the signal-to-noise ratio, the larger the gain coefficient. The higher the frequency, the smaller the gain coefficient. In the method and system, the audio signal may be further optimized on a basis of the conventional audio denoising method. More audio signals corresponding to frequencies including more valid audio signals are preserved, while less audio signals corresponding to frequencies including fewer valid audio signals are preserved. In this way, voice fidelity and intelligibility are preserved while noise is filtered, and the signal-to-noise ratio is increased.

Other functions of the audio denoising method and system provided in the present disclosure are partially mentioned in the following descriptions. Based on the descriptions, content described in the following figures and exemplary embodiments would be understandable for a person of ordinary skill in the art. Creative aspects of the audio denoising method and system provided in the present disclosure may be fully explained by practicing or using the method, system, or a combination thereof in the following detailed exemplary embodiments.

BRIEF DESCRIPTION OF THE DRAWINGS

To clearly describe the technical solutions in some exemplary embodiments of the present disclosure, the following briefly describes the accompanying drawings required for describing these exemplary embodiments. Apparently, the accompanying drawings in the following description show merely some exemplary embodiments of the present disclosure, and a person of ordinary skill in the art may derive other drawings from these accompanying drawings without creative efforts.

DETAILED DESCRIPTION

Figure 1:
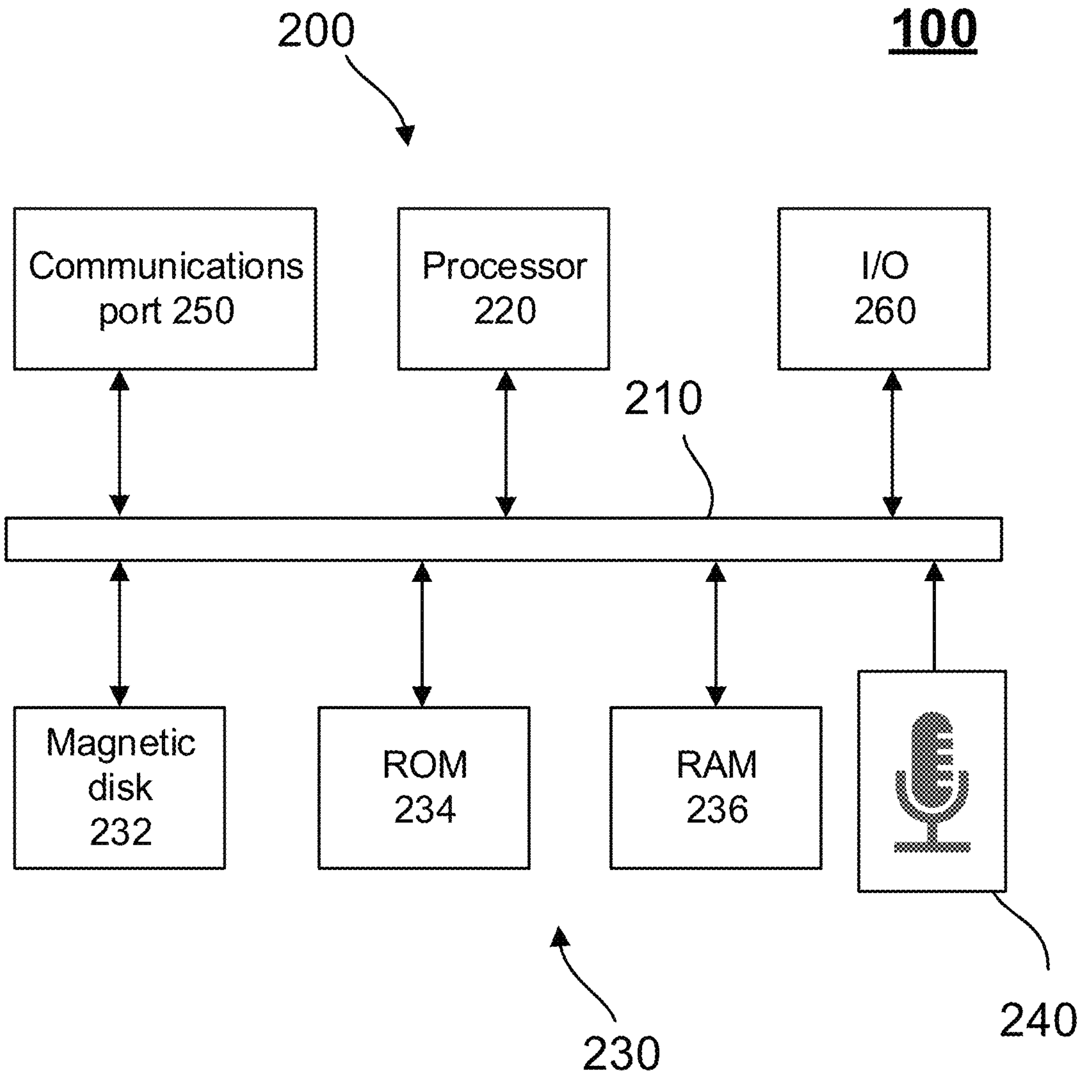
FIG. 1 is a schematic diagram of an audio denoising system according to some exemplary embodiments of the present disclosure.

The following description provides specific application scenarios and requirements of the present disclosure to enable a person skilled in the art to make or use the contents of the present disclosure. For a person skilled in the art, various modifications to the disclosed exemplary embodiments are obvious, and general principles defined herein can be applied to other applications without departing from the spirit and scope of the present disclosure. Therefore, the present disclosure is not limited to the illustrated exemplary embodiments, but is to be accorded the widest scope consistent with the claims.

The terms used herein are only intended to describe specific exemplary embodiments and are not restrictive. For example, unless otherwise clearly indicated in a context, the terms "a", "an", and "the" in singular forms may also include plural forms. When used in the present disclosure, the terms "comprising", "including", and/or "containing" indicate presence of associated integers, steps, operations, elements, and/or components. However, this does not exclude presence of one or more other features, integers, steps, operations, elements, components, and/or groups thereof or addition of other features, integers, steps, operations, elements, components, and/or groups thereof to the system/method.

In view of the following description, these features and other features of the present disclosure, operations and functions of related elements of structures, and combinations of components and economics of manufacturing thereof may be significantly improved. With reference to the drawings, all of these form a part of the present disclosure. However, it should be understood that the drawings are only for illustration and description purposes and are not intended to limit the scope of the present disclosure. It should also be understood that the drawings are not drawn to scale.

A flowchart provided in the present disclosure shows operations implemented by the system according to some exemplary embodiments of the present disclosure. It should be understood that operations in the flowchart may not be implemented sequentially. Conversely, the operations may be implemented in a reverse sequence or simultaneously. In addition, one or more other operations may be added to the flowchart, and one or more operations may be removed from the flowchart.

When performing denoising on audio signals, some denoising algorithms preserve audio signals on all frequencies almost evenly. In other words, the denoising algorithms perform same denoising processing on audio signals of different frequencies. Therefore, proportions of signals preserved on different frequencies of audio signals processed by using the denoising algorithms are consistent. However, in audio signals carrying noise, valid audio signals included in different frequencies are different. For example, a valid audio signal (that is, a human voiceprint) included in a low-frequency part in an audio signal carrying a noise signal is higher than a valid audio signal included in a high-frequency part. When performing denoising processing on the audio signals, the existing denoising algorithms ignore a frequency factor of the audio signals, resulting in roughly consistent denoising strength across different frequencies. For example, when a high-strength denoising algorithm is used to perform denoising processing on an audio signal carrying a noise signal, while a noise signal in a high-frequency part is reduced, a valid audio signal in a low-frequency part is discarded, and this may cause voice distortion. When a low-strength denoising algorithm is used to perform denoising processing on an audio signal carrying a noise signal, there may be an obvious noise residue in a high-frequency part, resulting in a poor audio denoising effect.

The valid audio signal may be an important audio signal carried by the audio signal. The noise signal may be an audio signal other than the valid audio signal. For example, during a voice call, the valid audio signal may be a human voice signal when a user of the call speaks, and the noise signal may be ambient noise, for example, sound of a vehicle, sound of whistling, etc. When special sound is obtained, for example, when sound of chirping is obtained, the valid audio signal may be an audio signal of chirping, and the noise signal may be sound of a wind, sound of water, or the like. For ease of description, a voice call is taken as an example for description herein, where the valid audio signal is a human voice signal when a user of the call speaks, and the noise signal may be ambient noise.

It should be noted that the noise signal and the valid audio signal are both signals obtained by using an estimation algorithm. The noise signal may be estimated by using a noise estimation algorithm. The valid audio signal may be obtained through estimation by subtracting the noise signal from an original audio signal.

In other audio denoising methods and systems provided in the following descriptions of the present disclosure, different gain processing may be performed on audio signals of different frequencies based on parameters related to the frequencies of the audio signals. In other words, in the audio denoising methods and systems provided in the present disclosure, gain processing may be performed on each frequency separately using frequencies of audio signals as units based on a feature of each frequency, so that proportions of audio denoising on all frequencies are uneven, so that more audio signals corresponding to frequency parts including more valid audio signals are preserved, while less audio signals corresponding to frequency parts including fewer valid audio signals are preserved. In this way, fidelity and intelligibility of an audio signal may be improved while quality of the audio signal maybe improved and noise maybe reduced.

The fidelity may be a similarity between an audio signal output by a device and an audio signal received by the device. The higher the fidelity, the higher the similarity between the audio signal output by the device and the audio signal received by the device. The intelligibility may also be voice articulation. The higher the voice articulation, the higher the intelligibility.

FIG. 1 is a schematic diagram of an audio denoising system 100 (hereinafter referred to as the system 100) according to some exemplary embodiments of the present disclosure. The system 100 may be applied to an electronic device 200.

In some exemplary embodiments, the electronic device 200 may be a wireless headphone, a wired headphone, or an intelligent wearable device, for example, a device having a voice obtaining function and a voice playing function such as smart glasses, a smart helmet, or a smart watch. The electronic device 200 may also be a mobile device, a tablet computer, a notebook computer, a built-in apparatus of a motor vehicle, or the like, or any combination thereof. In some exemplary embodiments, the mobile device may include a smart household device, a smart mobile device, a virtual reality device, an augmented reality device, or the like, or any combination thereof. For example, the smart mobile device may include a mobile phone, a personal digital assistant, a game device, a navigation device, an ultra-mobile personal computer (UMPC), or the like, or any combination thereof. In some exemplary embodiments, the smart household device may include a smart TV, a desktop computer, or the like, or any combination thereof. In some exemplary embodiments, the virtual reality device or the augmented reality device may include a virtual reality helmet, virtual reality glasses, a virtual reality patch, an augmented reality helmet, augmented reality glasses, an augmented reality patch, or the like, or any combination thereof. In some exemplary embodiments, the built-in apparatus of the motor vehicle may include a vehicle-mounted computer, a vehicle-mounted television, or the like.

The electronic device 200 may store data or an instruction (s) for performing an audio denoising method described in the present disclosure, and may execute the data and/or the instruction(s). The electronic device 200 may receive a to-be-processed audio signal, and execute data or an instruction of the audio denoising method described in the present disclosure to perform audio denoising processing on the to-be-processed audio signal, and generate a target audio signal. The audio denoising method is described in other parts of the present disclosure. For example, the audio denoising method is described in the descriptions of FIG. 2 to FIG. 6.

The to-be-processed audio signal may include at least one valid audio signal. The to-be-processed audio signal may also include a noise signal. The to-be-processed audio signal may be an audio signal locally stored by the electronic device 200, or may be an audio signal output by an audio obtaining device of the electronic device 200, or may be an audio signal sent by another device to the electronic device 200, or the like. The audio obtaining device may be integrated with the electronic device 200, or may be an externally connected device that is communicatively connected to the electronic device 200.

As shown in FIG. 1, the electronic device 200 may include at least one storage medium 230 and at least one processor 220. In some exemplary embodiments, the electronic device 200 may further include a communications port 250 and an internal communications bus 210. In addition, the electronic device 200 may further include an I/O component 260. In some exemplary embodiments, the electronic device 200 may further include a microphone module 240.

The internal communications bus 210 may connect different system components, including the storage medium 230, the processor 220, and the microphone module 240.

The I/O component 260 may support inputting/outputting between the electronic device 200 and another component. For example, the electronic device 200 may obtain the to-be-processed audio signal by using the I/O component 260.

The communications port 250 may be used by the electronic device 200 to perform external data communication. For example, the electronic device 200 may also obtain the to-be-processed audio signal by using the communications port 250.

The at least one storage medium 230 may include a data storage device. The data storage device may be a non-transitory storage medium, or may be a transitory storage medium. For example, the data storage apparatus may include one or more of a magnetic disk 232, a read-only memory (ROM) 234, or a random access memory (RAM) 236. The storage medium 230 may further include at least one instruction set stored in the data storage apparatus, where the instruction set is used for audio denoising. The instruction set may be computer program code, where the computer program code may include a program, a routine, an object, a component, a data structure, a process, a module, or the like for performing the audio denoising method provided in the present disclosure. The at least one storage medium 230 may also store the to-be-processed audio signal. The at least one storage medium 230 may further store a preset gain function, where the gain function is described in detail in subsequent descriptions.

The at least one processor 220 may be in communication with the at least one storage medium 230 by using the internal communications bus 210. The communication may be in any form and capable of directly or indirectly receiving information. The at least one processor 220 may be configured to execute the at least one instruction set. When the system 100 is in operation, the at least one processor 220 may read the at least one instruction set, and performs, based on an instruction of the at least one instruction set, the audio denoising method provided by the present disclosure. The processor 220 may perform all steps included in the audio denoising method. The processor 220 may be in a form of one or more processors. In some exemplary embodiments, the processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), or any other types of circuit or processor that can implement one or more functions, and the like, or any combination thereof. For illustration purpose only, only one processor 220 in the electronic device 200 is described in the present disclosure. However, it should be noted that the electronic device 200 in the present disclosure may include a plurality of processors. Therefore, operations and/or method steps disclosed in the present disclosure may be performed by one processor in the present disclosure, or may be performed jointly by a plurality of processors. For example, if the processor 220 of the electronic device 200 in the present disclosure performs step A and step B, it should be understood that step A and step B may also be performed jointly or separately by two different processors 220 (for example, the first processor performs step A, and the second processor performs step B, or the first processor and the second processor jointly perform step A and step B).

In some exemplary embodiments, the electronic device 200 may further include the microphone module 240. The microphone module 240 may be an audio obtaining device of the electronic device 200. The microphone module 240 may be configured to obtain a local audio signal, and output a microphone signal, that is, electrical signal carrying audio information. The to-be-processed audio signal may be the microphone signal output by the microphone module 240. The microphone module 240 may be in communication with the at least one processor 220 and the at least one storage medium 230. When the to-be-processed audio signal is a microphone signal, and the system 100 is in operation, the at least one processor 220 may read the at least one instruction set, obtain the microphone signal based on the instruction of the at least one instruction set, and perform the audio denoising method provided in the present disclosure. The microphone module 240 may be integrated with the electronic device 200, or may be a device externally connected to the electronic device 200.

The microphone module 240 may be configured to obtain a local audio signal, and output a microphone signal, that is, an electrical signal carrying audio information. The microphone module 240 may be an out-of-ear microphone module or may be an in-ear microphone module. For example, the microphone module 240 may be a microphone disposed out of an auditory canal, or may be a microphone disposed in an auditory canal. The microphone module 240 may be a first-type microphone, and may be a microphone directly capturing a human body vibration signal, for example, a bone-conduction microphone. The microphone module 240 may also be a second-type microphone, and may be a microphone directly capturing an air vibration signal, for example, an air-conduction microphone. The microphone module 240 may also be a combination of a first-type microphone and a second-type microphone. Certainly, the microphone module 240 may also be another type of microphone. For example, the microphone module 240 may be an optical microphone, or may be a microphone for receiving an electromyographic signal. For ease of presentation, in the following descriptions of the present disclosure, the bone-conduction microphone is used as an example of the first-type microphone, and the air-conduction microphone is used as an example of the second-type microphone for description.

The bone-conduction microphone may include a vibration sensor, for example, an optical vibration sensor or an acceleration sensor. The vibration sensor may obtain a mechanical vibration signal (for example, a signal generated by a vibration generated by the skin or bones when a user speaks), and convert the mechanical vibration signal into an electrical signal. Herein, the mechanical vibration signal mainly refers to a vibration propagated by a solid. The bone-conduction microphone obtains, by touching the skin or bones of the user by using the vibration sensor or a vibration component connected to the vibration sensor, a vibration signal generated by the bones or skin when the user makes a sound, and converts the vibration signal into an electrical signal. In some exemplary embodiments, the vibration sensor may be a device that is sensitive to a mechanical vibration but insensitive to an air vibration (that is, a capability of responding to the mechanical vibration by the vibration sensor exceeds a capability of responding to the air vibration by the vibration sensor). Because the bone-conduction microphone can directly pick a vibration signal of a sound generation part, the bone-conduction microphone can reduce impact of ambient noise.

The air-conduction microphone may obtain an air vibration signal caused when a user makes a sound, and may convert the air vibration signal into an electrical signal. The air-conduction microphone may be a separate air-conduction microphone, or may be a microphone array including two or more air-conduction microphones. The microphone array may be a beamforming microphone array or another similar microphone array. Sounds coming from different directions or positions may be obtained by using the microphone array.

The first-type microphone may output a first audio signal. The second-type microphone may output a second audio signal.

The system 100 may receive the to-be-processed audio signal, perform the audio denoising method described in the present disclosure to perform audio denoising processing on the to-be-processed audio signal, generate and output the target audio signal. The to-be-processed audio signal may be an original audio signal that is not denoised by using an audio denoising algorithm, or may be an audio signal obtained after the original audio signal is processed by using a first audio denoising algorithm. The original audio signal may be the first audio signal, or may be the second audio signal, or may be an audio signal obtained through fusion of the first audio signal and the second audio signal.

For example, the to-be-processed audio signal may be an audio signal obtained after the first audio signal is processed by using the first audio denoising algorithm, or may be an audio signal obtained after the second audio signal is processed by using the first audio denoising algorithm, or may be an audio signal obtained after the audio signal obtained through fusion of the first audio signal and the second audio signal is processed by using the first audio denoising algorithm.

The first audio denoising algorithm may be a conventional audio denoising algorithm, for example, at least one of: a spectral subtraction method, a Wiener filtering method, a Minimum Mean Square Error (MMSE) algorithm, an MMSE-based improved algorithm, or any combination thereof. The target audio signal obtained after denoising processing performed by the system 100 may preserve more audio signals including more valid audio signals. Therefore, voice quality of the target audio signal may be improved, and voice fidelity and intelligibility may be improved.

Figure 2:
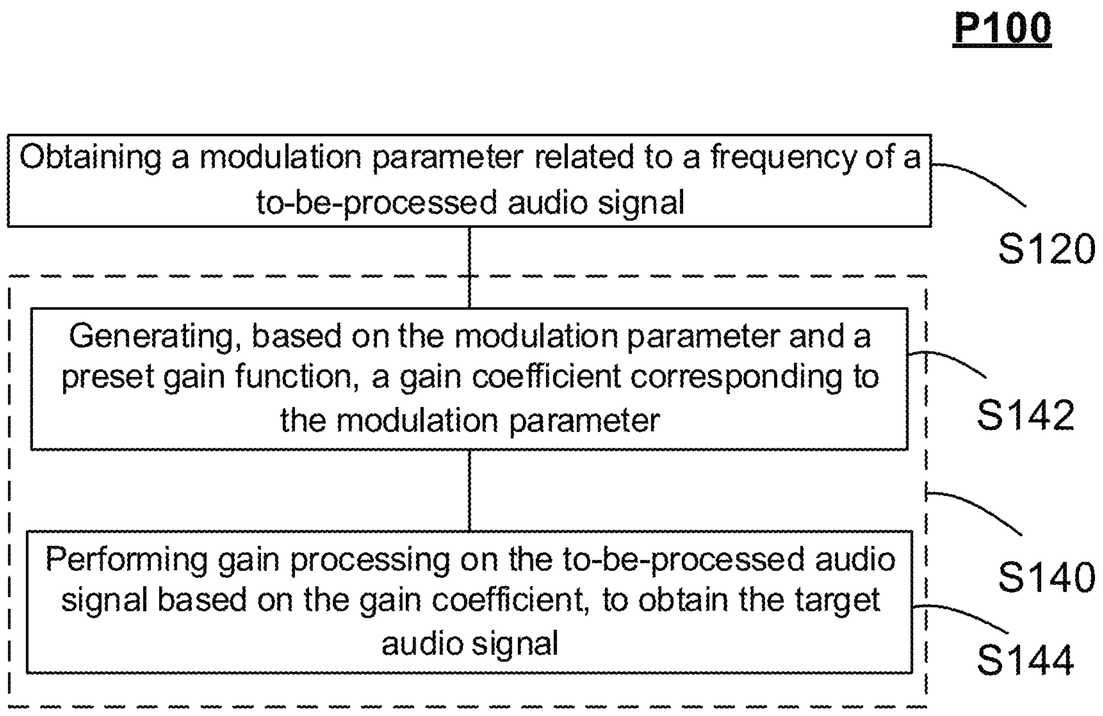
FIG. 2 is a flowchart of an audio denoising method according to some exemplary embodiments of the present disclosure.

FIG. 2 is a flowchart of an audio denoising method P100 according to some exemplary embodiments of the present disclosure. As shown in FIG. 2, the method P100 may include the following step performed by at least one processor 220:

S120, obtaining a modulation parameter related to a frequency of a to-be-processed audio signal.

As described above, in the method P100 and system 100, audio denoising may be performed on the to-be-processed audio signal by using the frequency as a unit. In a frequency domain, a frequency interval of an audio may be divided into a plurality of frequency units, that is, frequency intervals with preset bandwidths. Alternatively, a plurality of frequency units may be represented by a plurality of frequencies. In the method P100 and system 100, gain processing may be performed on an audio signal corresponding to each frequency unit or each frequency band unit in the frequency interval separately, so that more audio signals corresponding to frequency parts (for example, frequency intervals with high signal-to-noise ratios) including more valid audio signals are preserved, while less audio signals corresponding to frequency parts (for example, frequency intervals with low signal-to-noise ratios) including fewer valid audio signals are preserved. In this way, quality of the audio signal may be improved. For example, for a to-be-processed voice audio, if a signal-to-noise ratio of a low-frequency part of the to-be-processed voice audio is high (that is, a valid audio signal is strong and a noise signal is weak) but a signal-to-noise ratio of a high-frequency part is low (that is, the valid audio signal is weak and the noise signal is strong), in the method P100 and system 100, the high-frequency part in the audio may be suppressed while the low-frequency part may be amplified to improve quality of the entire voice audio. As a result, articulation of the valid audio signal in the voice audio signal may be improved while noise in the voice audio signal may be reduced.

Therefore, the modulation parameter may be a parameter related to a frequency in the frequency domain. There may be at least one modulation parameter. For example, the at least one modulation parameter may be at least one frequency unit, or may be at least one parameter related to the at least one frequency unit, and its amplitude may change with a change in frequency. For example, the at least one modulation parameter may be at least one signal-to-noise ratio (SNR), and the at least one signal-to-noise ratio may be the at least one parameter related to the frequency. Therefore, the at least one modulation parameter may reflect an amount of the valid audio signal included in the to-be-processed audio signal.

The modulation parameter may be a parameter related to the frequency of the to-be-processed audio signal. In the frequency domain, the frequency is a continuous parameter. For ease of calculation, the frequency of the to-be-processed audio signal may be divided into a plurality of frequency units. Each frequency unit may include a frequency interval with a preset bandwidth. Each frequency unit may also be represented by a frequency point. The frequency point may be an intermediate frequency value of a frequency interval, in which a current frequency unit is located, or an average frequency value, or the like. Bandwidths of frequency intervals of different frequency units may be the same or may be different. Spacings between adjacent frequency points may be the same or may be different. The system 100 may determine a bandwidth of the frequency interval of each frequency unit based on a feature of a noise signal of the to-be-processed audio signal. For example, when the noise signal is stable, the bandwidth of the frequency interval of the frequency unit may be larger. When the noise signal is unstable, the bandwidth of the frequency interval of the frequency unit may be smaller. For example, the frequency point may be 10 Hz, 100 Hz, 150 Hz, 200 Hz, 1000 Hz, or 10000 Hz.

For ease of description, the frequency of the to-be-processed audio signal may be approximately divided into a low frequency region, an intermediate frequency region, and a high frequency region. The low-frequency region may include frequencies in [0, a], where a is a frequency upper limit of the low-frequency region. For example, a may be any frequency between 400 and 800. For example, a may be 400, 450, 500, 550, 600, 650, 700, 750, or 800. The intermediate-frequency region may include frequencies in (a, b], where b is a frequency upper limit of the intermediate-frequency region. For example, b may be any frequency between 2000 and 4000. For example, b may be 2000, 2500, 3000, 3500, or 4000. The high-frequency region may include frequencies in [b, c], where c is a frequency upper limit of the high-frequency region. The frequency upper limit c of the high-frequency region may be any frequency greater than 4000.

Specifically, the modulation parameter may be the plurality of frequency units of the to-be-processed audio signal, or may be a plurality of signal-to-noise ratios corresponding to the plurality of frequency units, or may be the plurality of frequency units and a plurality of signal-to-noise ratios corresponding to the plurality of frequency units. Using a voice call as an example, there are more valid audio signals in a low frequency region than that of in a high frequency region. The signal-to-noise ratio may be a proportion of valid audio signals to noise signals in the to-be-processed audio signal. If a signal-to-noise ratio corresponding to the frequency is higher, it may indicate that a proportion of valid audio signals in the current frequency is higher.

Alternatively, the modulation parameter may be any parameter related to the frequency. For example, the modulation parameter may be strength of a plurality of valid audio signals corresponding to the plurality of frequency units, or may be strength of a plurality of noise signals corresponding to the plurality of frequency units. The plurality of frequency units may be the plurality of frequency points. For ease of presentation, in the following descriptions, it is assumed that the modulation parameter may be at least one of: the plurality of frequency units of the to-be-processed audio signal or the plurality of signal-to-noise ratios corresponding to the plurality of frequency units.

To obtain the modulation parameter of the to-be-processed audio signal, the system 100 may first divide the to-be-processed audio signal into frames. A frame is a basic unit forming an audio signal. During data processing of an audio signal, frames may be generally used as basic units for calculation. The to-be-processed audio signal may include one or more audio frames. An audio frame may include an audio signal of a preset duration. An audio signal in each audio frame may be stable. Adjacent audio frames may partially overlap. The preset duration may be 20-50 milliseconds, for example, 20 milliseconds, 25 milliseconds, 30 milliseconds, 40 milliseconds, or 50 milliseconds. Certainly, the preset duration may also be longer or shorter. Durations of different audio frames may be the same or may be different.

It should be noted that a plurality of frequency units in different audio frames may be the same or may be different.

To obtain a spectrogram of the to-be-processed audio signal, the system 100 may perform Fourier transform on the audio frame, to obtain signal distribution of each frequency in the audio frame. The signal distribution of each frequency may be the strength of audio signals corresponding to each frequency in the audio frame.

The system 100 may obtain, based on the signal distribution of each frequency in each audio frame in the to-be-processed audio signal, the modulation parameter corresponding to each audio frame in the to-be-processed audio signal, that is, a plurality of frequency units in each audio frame in the to-be-processed audio signal and a plurality of signal-to-noise ratios corresponding to the plurality of frequency units. Each frequency in the plurality of frequency units corresponds to one signal-to-noise ratio of the plurality of signal-to-noise ratios. Signal-to-noise ratios corresponding to audio signals of different frequencies may be different.

It should be noted that when performing audio denoising processing on the to-be-processed audio signal, the system 100 may perform the audio denoising processing on all audio frames, or may perform the audio denoising processing on some audio frames.

When the modulation parameter includes the plurality of signal-to-noise ratios, step S120 may include: obtaining an initial modulation parameter corresponding to a frequency of a to-be-processed audio signal; and performing smoothing processing on a value of the initial modulation parameter by using the frequency as a variable, and obtaining the initial modulation parameter. The initial modulation parameter corresponding to the to-be-processed audio signal may be a plurality of initial signal-to-noise ratios corresponding to the plurality of frequency units in each audio frame in the to-be-processed audio signal. The initial signal-to-noise ratio may be a signal-to-noise ratio corresponding to each frequency unit. Initial signal-to-noise ratios corresponding to audio signals of different frequency units may be different. Initial signal-to-noise ratios corresponding to audio signals of adjacent frequency units may also be different, and may even vary greatly.

To enable smooth transitions of the plurality of signal-to-noise ratios corresponding to the plurality of frequency units in each audio frame in the to-be-processed audio signal, the system 100 may perform the smoothing processing on the value of the initial modulation parameter by using the frequency as a variable, to obtain the modulation parameter. As described above, the initial modulation parameter may be the plurality of initial signal-to-noise ratios corresponding to the plurality of frequency units.

The smoothing processing may use any appropriate processing manner. For example, the smoothing processing may be performing feature fusion processing on an initial signal-to-noise ratio corresponding to each of the plurality of frequency units and an initial signal-to-noise ratio corresponding to at least one frequency unit near (e.g., centered at) a current frequency unit, to obtain a signal-to-noise ratio corresponding to the current frequency unit. As described above, each frequency unit may be represented by a frequency point. For example, the feature fusion may be averaging the signal-to-noise ratios. Performing the smoothing processing on a signal-to-noise ratio corresponding to a frequency unit may be averaging signal-to-noise ratios of several frequency units before the frequency unit and several frequency units after the frequency unit, and may be represented by the following formula:

$$SNR[i] = \frac{\sum_{j=i-n}^{j=i+m} SNR_0[j]}{n+m+1} \quad \text{formula (1)}$$

where i is an identifier of a frequency unit in Hz, for example, i may be a frequency point corresponding to the current frequency unit; SNR[i] may be a signal-to-noise ratio corresponding to the frequency unit i; $SNR_0[j]$ may be an initial signal-to-noise ratio corresponding to the frequency unit j; n and m may be quantities of adjacent frequency units on which feature fusion is performed in the smoothing processing, or may be referred to as quantities of smoothed frequency units; n and m are any integers greater than or equal to 0; and the smoothing processing may optimize the audio denoising processing performed by the system 100 on the to-be-processed audio signal.

S140, performing gain processing on the to-be-processed audio signal based on a gain coefficient corresponding to the modulation parameter to obtain a target audio signal. Specifically, step S140 may include:

S142, generating, based on the modulation parameter and a preset gain function, the gain coefficient corresponding to the modulation parameter.

As described above, the system 100 may perform denoising processing on the to-be-processed audio signal based on the frequency of the to-be-processed audio signal. Specifically, the system 100 may perform gain processing, by using the plurality of frequency units of the to-be-processed audio signal as units, on audio signals corresponding to the plurality of frequency units of the to-be-processed audio signal.

The system 100 may perform gain processing on the to-be-processed audio signal by using the preset gain function. There may be at least one gain coefficient. The gain function may be a correlation function between the at least one gain coefficient and at least one modulation parameter.

The at least one gain coefficient may be any number greater than 0. The at least one gain coefficient may be any number from 0 to 1, including 0 and 1. When more valid audio signals are included in the current frequency unit of the to-be-processed audio signal, noise is lower, and a gain coefficient corresponding to the current frequency unit is larger, so that more valid audio signals may be preserved. When fewer valid audio signals are included in the current frequency unit of the to-be-processed audio signal, the noise is higher, and the gain coefficient corresponding to the current frequency unit is smaller, so that the noise signal may be reduced. In some exemplary embodiments, the at least one gain coefficient may also be any number greater than 1. When a lot of valid audio signals and little noise are included in some frequency units in the to-be-processed audio signal, the gain coefficient corresponding to the current frequency unit may be a coefficient greater than 1, so that the valid audio signals may be enhanced.

As described above, the valid audio signal included in the to-be-processed audio signal may be reflected by using the modulation parameter. Therefore, the gain function may be a monotonic function related to the modulation parameter. For example, if there are more valid audio signals and less noise signals, the gain coefficient may be larger; or if there are fewer valid audio signals and more noise signals, the gain coefficient may be smaller.

The gain function may be any monotonic function. For example, the gain function may be a monotonic function based on a sigmoid function, or the gain function may be a monotonic function based on a log function, or the gain function may be a monotonic function based on a tan function. For ease of description, in the following descriptions, it is assumed that the gain function is a monotonic function based on a sigmoid function. The gain function may be a linear monotonic function or a non-linear correlation function.

When the modulation parameter is the plurality of signal-to-noise ratios corresponding to the plurality of frequency units, higher signal-to-noise ratio corresponding to the frequency unit means more valid audio signals are included in the current frequency unit, and in this case, the gain coefficient corresponding to the current frequency unit is larger, so that more signals corresponding to the current frequency unit may be preserved. Lower signal-to-noise ratio corresponding to the frequency unit means fewer valid audio signals and more noise signals are included in the current frequency unit, and in this case, the gain coefficient corresponding to the current frequency unit is smaller, so that more signals corresponding to the current frequency unit may be discarded. Therefore, the gain coefficient is in positive correlation with the plurality of signal-to-noise ratios.

When the modulation parameter is the plurality of frequency units, more audio signals may be discarded in a high-frequency part, that is, a gain coefficient corresponding to the high-frequency part is smaller; and more audio signals may be preserved in a low-frequency part, that is, a gain coefficient corresponding to the low-frequency part is larger, a better audio denoising effect may be achieved. Therefore, when the frequency point corresponding to the current frequency unit is lower, the gain coefficient corresponding to the current frequency unit is larger, so that more signals corresponding to the current frequency unit may be preserved. When the frequency point corresponding to the current frequency unit is higher, the gain coefficient corresponding to the current frequency unit is smaller, so that more signals corresponding to the current frequency unit may be discarded. Therefore, when the valid audio signal is a human voice signal, the gain coefficient is in negative correlation with the plurality of frequency units.

The gain function may be any one of a first gain function, a second gain function, or a third gain function. The first gain function may be a correlation between a first gain coefficient and a frequency, where the first gain coefficient is in negative correlation with the frequency. The second gain function may be a correlation between a second gain coefficient and a signal-to-noise ratio, where the second gain coefficient is in positive correlation with the signal-to-noise ratio. The third gain function may be a correlation between a third gain coefficient and a frequency and a signal-to-noise ratio, where the third gain coefficient is in negative correlation with the frequency and is in positive correlation with the signal-to-noise ratio. The gain coefficient may include one of the first gain coefficient, the second gain coefficient, and the third gain coefficient.

When the modulation parameter is the plurality of frequency units, the gain function may be the first gain function, and the gain coefficient may be the first gain coefficient. When the modulation parameter is the plurality of signal-to-noise ratios corresponding to the plurality of frequency units, the gain function may be the second gain function, and the gain coefficient may be the second gain coefficient. When the modulation parameter is the plurality of frequency units and the plurality of signal-to-noise ratios corresponding to the plurality of frequency units, the gain function may be the third gain function, and the gain coefficient may be the third gain coefficient.

Figure 3:
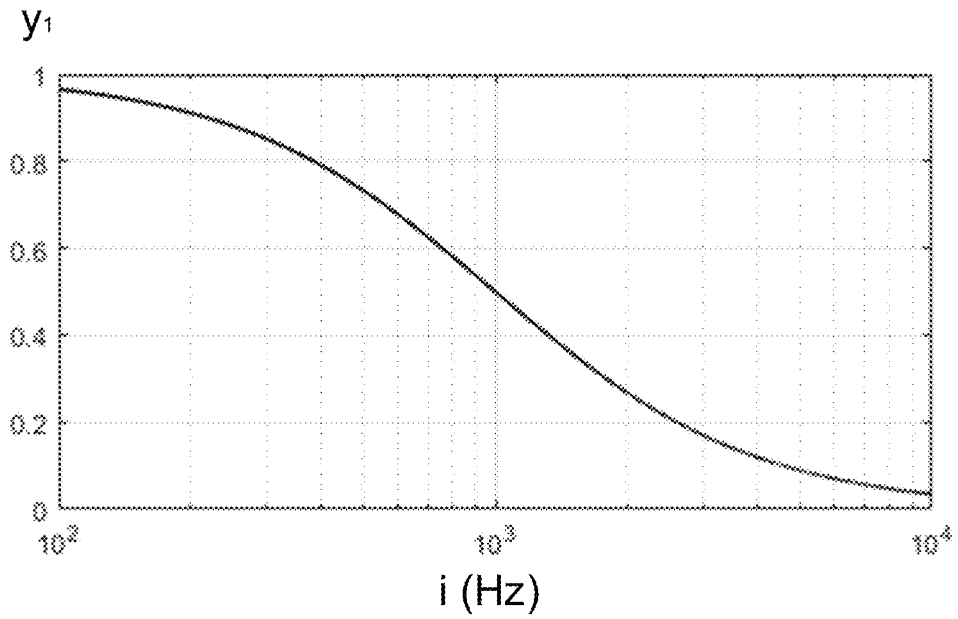
FIG. 3 is a schematic diagram of a first gain function according to some exemplary embodiments of the present disclosure.

As an example, assuming the gain function is a monotonic function based on a sigmoid function, the first gain function may be represented by the following formula:

$$y_1 = \frac{1}{1 + e^{-(f_1(i)+c)}} \quad \text{formula (2)}$$

where $y_1$ may be the first gain coefficient, i may be a frequency point corresponding to a frequency unit, $f_1(i)$ may be a normalization function of the frequency unit, and c may be a constant. FIG. 3 is a schematic diagram of the first gain function according to some exemplary embodiments of the present disclosure. As shown in FIG. 3, an x-axis shows a frequency point i corresponding to a frequency unit, and a y-axis shows the first gain coefficient $y_1$. The first gain coefficient $y_1$ is in negative correlation with the frequency point i corresponding to the frequency unit.

Figure 4:
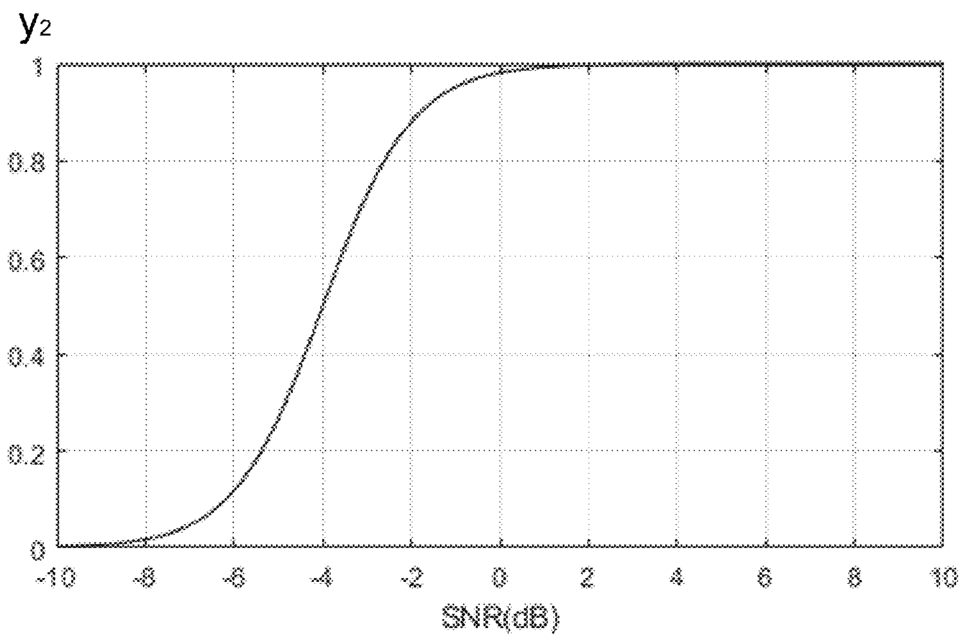
FIG. 4 is a schematic diagram of a second gain function according to some exemplary embodiments of the present disclosure.

As an example, assuming the gain function is a monotonic function based on a sigmoid function, the second gain function may be represented by the following formula:

$$y_2 = \frac{1}{1 + e^{-(f_2(SNR[i])+c)}} \quad \text{formula (3)}$$

where $y_2$ may be the second gain coefficient, SNR[i] may be a signal-to-noise ratio corresponding to a frequency point i, $f_2$(SNR[i]) may be a normalization function of the signal-to-noise ratio, and c may be a constant. FIG. 4 is a schematic diagram of the second gain function according to some exemplary embodiments of the present disclosure. As shown in FIG. 4, an x-axis shows a signal-to-noise ratio SNR, and a y-axis shows the second gain coefficient $y_2$. The second gain coefficient $y_2$ is in positive correlation with the signal-to-noise ratio SNR.

Figure 5:
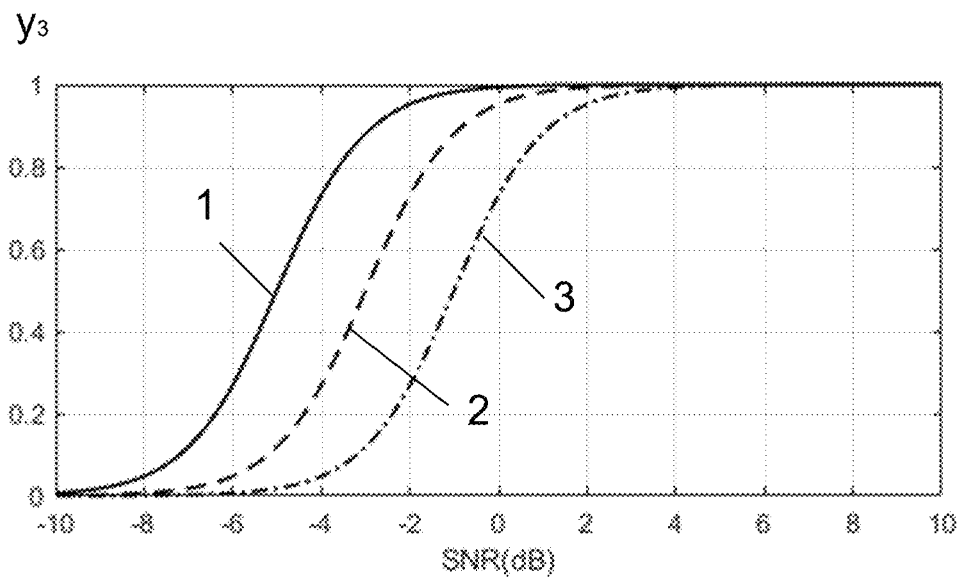
FIG. 5 is a schematic diagram of a third gain function according to some exemplary embodiments of the present disclosure.

As an example, assuming that the gain function is a monotonic function based on a sigmoid function, the third gain function may be represented by the following formula:

$$y_3 = \frac{1}{1 + e^{-(f_3(i,\ SNR[i])+c)}} \quad \text{formula (4)}$$

where $y_3$ may be the third gain coefficient, i may be a frequency point corresponding to a frequency unit, SNR[i] may be a signal-to-noise ratio corresponding to the frequency pointi, $f_3$(i, SNR[i]) may be a normalization function of the frequency point corresponding to the frequency unit, and c may be a constant. FIG. 5 is a schematic diagram of the third gain function according to some exemplary embodiments of the present disclosure; and FIG. 6 is a schematic diagram of the third gain function according to some exemplary embodiments of the present disclosure.

As shown in FIG. 5, an x-axis shows a signal-to-noise ratio SNR, and a y-axis shows the third gain coefficient $y_3$. A curve 1 indicates a relationship between the third gain coefficient $y_3$ and the signal-to-noise ratio SNR when a frequency pointi corresponding to a frequency unit is $i_1$. A curve 2 indicates a relationship between the third gain coefficient $y_3$ and the signal-to-noise ratio SNR when a frequency pointi corresponding to a frequency unit is $i_2$ A curve 3 indicates a relationship between the third gain coefficient $y_3$ and the signal-to-noise ratio SNR when a frequency pointi corresponding to a frequency unit is $i_3$. $i_1<i_2<i_3$. As shown in FIG. 5, the third gain coefficient $y_3$ is in negative correlation with the frequency point i corresponding to the frequency unit, and is in positive correlation with the signal-to-noise ratio SNR.

Figure 6:
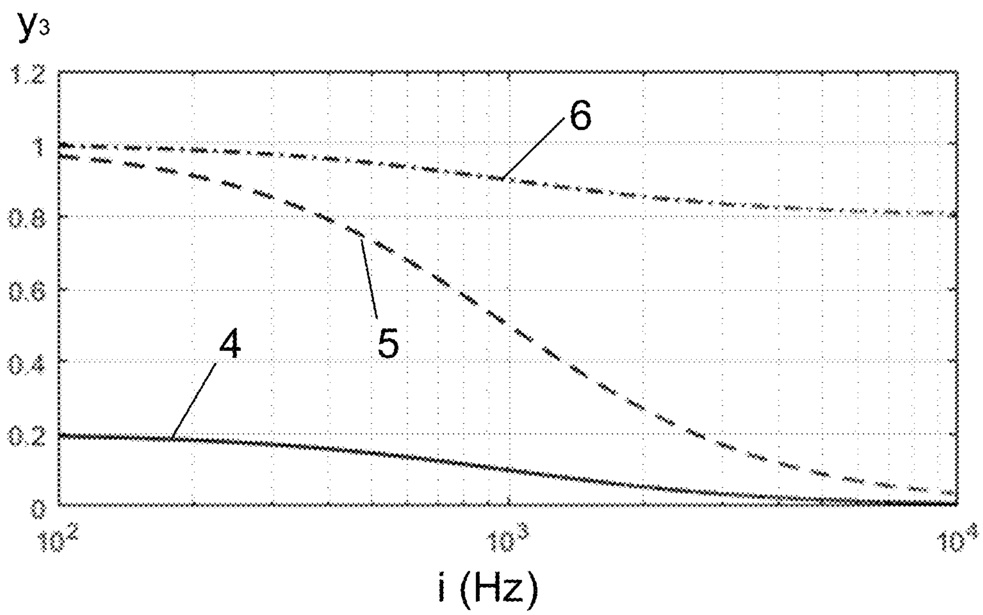
FIG. 6 is a schematic diagram of a third gain function according to some exemplary embodiments of the present disclosure.

As shown in FIG. 6, an x-axis shows a frequency point i corresponding to a frequency unit, and a y-axis shows the third gain coefficient $y_3$. A curve 4 indicates a relationship between the third gain coefficient $y_3$ and the frequency pointi corresponding to the frequency unit when a signal-to-noise ratio SNR is $SNR_1$. A curve 5 indicates a relationship between the third gain coefficient $y_3$ and the frequency point i corresponding to the frequency unit when a signal-to-noise ratio SNR is $SNR_2$. A curve 6 indicates a relationship between the third gain coefficient $y_3$ and the frequency point i corresponding to the frequency unit when a signal-to-noise ratio SNR is $SNR_3$. $SNR_1<SNR_2<SNR_3$. As shown in FIG. 6, the third gain coefficient $y_3$ is in negative correlation with the frequency point i corresponding to the frequency unit, and is in positive correlation with the signal-to-noise ratio SNR.

The third gain coefficient may be further represented by the following formula, to achieve an audio denoising effect of higher precision:

$$y_3 = \frac{A}{1 + e^{-(a \times f_3(i,\ SNR[i]) + c)}} + B \qquad \text{formula (5)}$$

It should be noted that FIG. 3 to FIG. 6 are only exemplary, and the gain function may also be another monotonic function. A person skilled in the art should understand that all monotonic functions satisfying a requirement may be the gain function described in the present disclosure and all fall within the protection scope of the present disclosure.

Step S142 may include one of the following cases:

- when the modulation parameter is the plurality of frequency units, generating, based on the plurality of frequency units and the first gain function, a plurality of first gain coefficients corresponding to the plurality of frequency units;
- when the modulation parameter is the plurality of signal-to-noise ratios corresponding to the plurality of frequency units, generating, based on the plurality of signal-to-noise ratios and the second gain function, a plurality of second gain coefficients corresponding to the plurality of frequency units; and
- when the modulation parameter is the plurality of frequency units and the plurality of signal-to-noise ratios corresponding to the plurality of frequency units, generating, based on the plurality of signal-to-noise ratios, the plurality of frequency units, and the third gain function, a plurality of third gain coefficients corresponding to the plurality of frequency units.

Step S140 may further include:

S144, performing gain processing on the to-be-processed audio signal based on the gain coefficient, to obtain the target audio signal. Specifically, the system 100 may perform the gain processing on each of the plurality of frequency units based on a plurality of gain coefficients corresponding to the plurality of frequency units, to obtain the target audio signal. Specifically, the system 100 may multiply a gain coefficient corresponding to each frequency unit by strength of an audio signal corresponding to the current frequency unit, so as to obtain a gain audio signal corresponding to the current frequency unit; and superimpose the plurality of gain audio signals corresponding to the plurality of frequency units, to obtain the target audio signal.

In the target audio signal, more or all audio signals corresponding to a frequency including more valid audio signals may be preserved, and more or all audio signals corresponding to a frequency including less valid audio signals and including more noise signals may be discarded.

In summary, in the audio denoising method P100 and system 100 provided in the present disclosure, gain processing may be performed on each frequency unit separately using audio signals frequencies as units, based on a feature (s) of each frequency, so that more audio signals corresponding to frequency units including more valid audio signals may be preserved, while less audio signals corresponding to frequency units including fewer valid audio signals may be preserved. In this way, fidelity and intelligibility of an audio signal are improved while quality of the audio signal may be improved and noise may be reduced.

It should be noted that the system 100 and the method P100 may be used to perform denoising processing on an audio signal that has been processed by using a first audio denoising algorithm, or may be used to perform denoising processing on an audio signal that has not been processed by using the first audio denoising algorithm. The system 100 and the method P100 may also be combined with the first audio denoising algorithm, to jointly perform denoising processing on the audio signal. Specifically, the electronic device 200 may first obtain the target audio signal by performing denoising processing on the audio signal by using the method P100, and then perform denoising processing on the target audio signal by using the first audio denoising algorithm. Alternatively, the electronic device 200 may first perform denoising processing on the to-be-processed audio signal by using the first audio denoising algorithm, and then perform denoising processing, by using the method P100, on the audio signal that is processed by using the first audio denoising algorithm, to obtain the target audio signal.

Another aspect of the present disclosure provides a non-transitory storage medium. The non-transitory storage medium stores at least one set of executable instructions for audio denoising, and when the executable instructions are executed by a processor, the executable instructions instruct the processor to implement steps of the audio denoising method P100 described in the present disclosure. In some possible implementations, each aspect of the present disclosure may be further implemented in a form of a program product, where the program product may include a program code. When the program product is in operation on the electronic device 200, the program code may be used to enable the electronic device 200 to perform steps of audio denoising method described in the present disclosure. The program product for implementing the aforementioned method may use a portable compact disc read-only memory (CD-ROM) including program code, and may operate on the electronic device 200. However, the program product in the present disclosure is not limited thereto. In the present disclosure, a readable storage medium may be any tangible medium containing or storing a program, and the program may be used by or in connection with an instruction execution system (for example, the processor 220). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium may include: an electrical connection having one or more conducting wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. The readable storage medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program used by or in connection with an instruction execution system, apparatus, or device. The program code contained in the readable storage medium may be transmitted through any appropriate medium, including, but not limited to: wireless or wired medium, an optical cable, radio frequency (RF), or the like, or any appropriate combination thereof. Any combination of one or more programming languages may be used to compile program code for performing operations in the present disclosure. The programming languages include object-oriented programming languages such as Java and C++, and may further include conventional procedural programming languages such as the "C" language or a similar programming language. The program code may be fully executed on the electronic device 200, partially executed on the electronic device 200, executed as an independent software package, partially executed on the electronic device 200 and partially executed on a remote computing device, or fully executed on a remote computing device.

Specific exemplary embodiments in the present disclosure are described above. Other embodiments also fall within the scope of the appended claims. In some cases, actions or steps described in the claims may be performed in a sequence different from those of these exemplary embodiments, and the expected results may still be achieved. In addition, illustration of specific sequences or continuous sequences may not be necessarily required for the processes described in the drawings to achieve the expected results. In some exemplary embodiments, multi-task processing and parallel processing are also allowed or may be advantageous.

In summary, after reading details of the present disclosure, a person skilled in the art would understand that the details in the present disclosure are exemplary only, and may not be restrictive. A person skilled in the art would understand that the present disclosure covers various reasonable changes, improvements, and modifications to the embodiments, although this is not specified herein. These changes, improvements, and modifications are intended to be proposed in the present disclosure and are within the spirit and scope of the exemplary embodiments of the present disclosure.

In addition, some terms in the present disclosure are used to describe some exemplary embodiments of the present disclosure. For example, "one embodiment", "an embodiment", and/or "some exemplary embodiments" mean/means that a specific feature, structure, or characteristic described with reference to the embodiment(s) may be included in at least one embodiment of the present disclosure. Therefore, it should be emphasized and should be understood that two or more references to "an embodiment" or "one embodiment" or "alternative embodiment" in various parts of the present disclosure do not necessarily all refer to the same embodiment. In addition, specific features, structures, or characteristics may be appropriately combined in one or more embodiments of the present disclosure.

It should be understood that in the foregoing description of the embodiments of the present disclosure, to help understand one feature, for the purpose of simplifying the present disclosure, various features in the present disclosure may be combined in a single embodiment, single drawing, or description thereof. However, this does not mean that the combination of these features is necessary. It is possible for a person skilled in the art to extract some of the features as a separate embodiment for understanding when reading the present disclosure. In other words, an embodiment in the present disclosure may also be understood as an integration of a plurality of sub-embodiments. It is also true when content of each sub-embodiment is less than all features of a single embodiment disclosed above.

Each patent, patent application, patent application publication, and other materials cited herein, such as articles, books, instructions, publications, documents, and other materials may be incorporated herein by reference. All contents used for all purposes, except any prosecution document history related to the content, any identical prosecution document history that may be inconsistent or conflict with this document, or any identical prosecution document history that may have restrictive impact on the broadest scope of the claims, is associated with this document now or later. For example, if there is any inconsistency or conflict between descriptions, definitions, and/or use of terms associated with any material contained therein and descriptions, definitions, and/or use of terms related to this document, the terms in this document shall prevail.

Finally, it should be understood that the implementation solutions of the present disclosure disclosed herein are descriptions of principles of the implementation solutions of the present disclosure. Other modified embodiments also fall within the scope of the present disclosure. Therefore, the embodiments disclosed in the present disclosure are merely exemplary and not restrictive. A person skilled in the art may use alternative configurations according to the embodiments of the present disclosure to implement the application in the present disclosure. Therefore, the embodiments of the present disclosure are not limited to those precisely described herein.

What is claimed is:

1. An audio denoising system, comprising:

at least one storage medium storing at least one set of instruction for audio denoising; and at least one processor in communication with the at least one storage medium, wherein during operation, the at least one processor executes the set of instructions to:

obtain a to-be-processed audio signal, obtain at least one modulation parameter related to a frequency of the to-be-processed audio signal, wherein the at least one modulation parameter at least includes a plurality of frequency units of the to-be-processed audio signal, based on the at least one modulation parameter and a preset gain function, obtain at least one gain coefficient corresponding to the at least one modulation parameter, wherein the at least one gain coefficient is in a negative correlation with the plurality of frequency units, perform gain processing on the to-be-processed audio signal based on the at least one gain coefficient corresponding to the at least one modulation parameter to obtain a target audio signal, and output the target audio signal.

2. The audio denoising system according to claim 1, wherein the at least one modulation parameter further includes:

a plurality of signal-to-noise ratios corresponding to the plurality of frequency units.

3. The audio denoising system according to claim 1, wherein the to-be-processed audio signal includes an audio signal obtained after an original audio signal is processed by using a first audio denoising algorithm.

4. The audio denoising system according to claim 3, wherein the original audio signal includes at least one of:

a first audio signal output by a first-type microphone, a second audio signal output by a second-type microphone, or an audio signal obtained after fusion of the first audio signal and the second audio signal.

5. The audio denoising system according to claim 1, wherein to perform the gain processing on the to-be-processed audio signal based on the at least one gain coefficient corresponding to the at least one modulation parameter to obtain the target audio signal, the at least one processor further executes the set of instructions to:

generate, based on the at least one modulation parameter and the preset gain function, the at least one gain coefficient corresponding to the at least one modulation parameter, wherein the preset gain function includes a correlation between the at least one gain coefficient and the at least one modulation parameter; and perform the gain processing on the to-be-processed audio signal based on the at least one gain coefficient to obtain the target audio signal.

6. The audio denoising system according to claim 5, wherein the preset gain function is a monotonic function;

wherein the at least one gain coefficient is in a positive correlation with the plurality of signal-to-noise ratios.

7. The audio denoising system according to claim 6, wherein the at least one modulation parameter is the plurality of frequency units;

the preset gain function is a first gain function including a correlation between at least one first gain coefficient and the frequency;

the at least one gain coefficient is the at least one first gain coefficient; and to generate, based on the at least one modulation parameter and the preset gain function, the at least one gain coefficient corresponding to the at least one modulation parameter, the at least one processor further executes the set of instructions to:

generate, based on the plurality of frequency units and the first gain function, a plurality of first gain coefficients corresponding to the plurality of frequency units.

8. The audio denoising system according to claim 6, wherein the at least one modulation parameter is the plurality of signal-to-noise ratios corresponding to the plurality of frequency units;

the preset gain function is a second gain function including a correlation between at least one second gain coefficient and the plurality of signal-to-noise ratios;

the at least one gain coefficient is the at least one second gain coefficient; and to generate, based on the at least one modulation parameter and the preset gain function, the at least one gain coefficient corresponding to the at least one modulation parameter, the at least one processor further executes the set of instructions to:

generate, based on the plurality of signal-to-noise ratios and the second gain function, a plurality of second gain coefficients corresponding to the plurality of frequency units.

9. The audio denoising system according to claim 6, wherein the at least one modulation parameter is the plurality of frequency units and the plurality of signal-to-noise ratios corresponding to the plurality of frequency units;

the preset gain function is a third gain function including a correlation between at least one third gain coefficient and the frequency and the plurality of signal-to-noise ratios; the at least one gain coefficient is the at least one third gain coefficient; and to generate, based on the at least one modulation parameter and the preset gain function, the at least one gain coefficient corresponding to the at least one modulation parameter, the at least one processor further executes the set of instructions to:

generate, based on the plurality of signal-to-noise ratios, the plurality of frequency units, and the third gain function, a plurality of third gain coefficients corresponding to the plurality of frequency units.

10. The audio denoising system according to claim 6, wherein the preset gain function is a function based on a sigmoid function.

11. The audio denoising system according to claim 5, wherein to perform the gain processing on the to-be-processed audio signal based on the at least one gain coefficient to obtain the target audio signal, the at least one processor further executes the set of instructions to:

perform the gain processing on each of the plurality of frequency units based on the at least one gain coefficient, to obtain the target audio signal.

12. The audio denoising system according to claim 1, wherein to obtain the at least one modulation parameter related to the frequency of the to-be-processed audio signal, the at least one processor further executes the set of instructions to:

obtain at least one initial modulation parameter corresponding to the frequency of the to-be-processed audio signal; and perform smoothing processing on a value of the at least one initial modulation parameter by using the frequency as a variable to obtain the at least one modulation parameter.

13. The audio denoising system according to claim 12, wherein to perform the smoothing processing on the value of the at least one initial modulation parameter with the frequency as the variable, the at least one processor further executes the set of instructions to:

perform feature fusion processing on an initial signal-to-noise ratio corresponding to each of the plurality of frequency units and an initial signal-to-noise ratio corresponding to at least one frequency unit near a current frequency unit, to obtain a signal-to-noise ratio corresponding to the current frequency unit.

14. An audio denoising method, comprising:

obtaining a to-be-processed audio signal;

obtaining at least one modulation parameter related to a frequency of the to-be-processed audio signal;

based on the at least one modulation parameter and a preset gain function, obtaining at least one gain coefficient corresponding to the at least one modulation parameter, wherein the at least one gain coefficient is in a negative correlation with the plurality of frequency units;

performing gain processing on the to-be-processed audio signal based on at least one gain coefficient corresponding to the at least one modulation parameter to obtain a target audio signal; and outputting the target audio signal, wherein the at least one modulation parameter at least includes plurality of frequency units of the to-be-processed audio signal.

15. The audio denoising method according to claim 14, wherein the performing of the gain processing on the to-be-processed audio signal based on the at least one gain coefficient corresponding to the at least one modulation parameter to obtain the target audio signal includes:

generating, based on the at least one modulation parameter and the preset gain function, the at least one gain coefficient corresponding to the at least one modulation parameter, wherein the preset gain function includes a correlation between the at least one gain coefficient and the at least one modulation parameter; and performing the gain processing on the to-be-processed audio signal based on the at least one gain coefficient to obtain the target audio signal.

16. The audio denoising method according to claim 14, wherein the preset gain function is a monotonic function;

wherein the at least one gain coefficient is in a positive correlation with the plurality of signal-to-noise ratios.

17. The audio denoising method according to claim 16, wherein the at least one modulation parameter is the plurality of frequency units;

the preset gain function is a first gain function including a correlation between at least one first gain coefficient and the frequency;

the at least one gain coefficient is the at least one first gain coefficient; and the generating, based on the at least one modulation parameter and the preset gain function, of the at least one gain coefficient corresponding to the at least one modulation parameter includes:

generating, based on the plurality of frequency units and the first gain function, a plurality of first gain coefficients corresponding to the plurality of frequency units.

18. The audio denoising method according to claim 16, the at least one modulation parameter further includes a plurality of signal-to-noise ratios corresponding to the plurality of frequency units, wherein the at least one modulation parameter is the plurality of signal-to-noise ratios corresponding to the plurality of frequency units;

the preset gain function is a second gain function including a correlation between at least one second gain coefficient and the plurality of signal-to-noise ratios;

the at least one gain coefficient is the at least one second gain coefficient; and the generating, based on the at least one modulation parameter and the preset gain function, of the at least one gain coefficient corresponding to the at least one modulation parameter includes:

generating, based on the plurality of signal-to-noise ratios and the second gain function, a plurality of second gain coefficients corresponding to the plurality of frequency units.

19. The audio denoising method according to claim 16, the at least one modulation parameter further includes a plurality of signal-to-noise ratios corresponding to the plurality of frequency units, wherein the at least one modulation parameter is the plurality of frequency units and the plurality of signal-to-noise ratios corresponding to the plurality of frequency units;

the preset gain function is a third gain function including a correlation between at least one third gain coefficient and the frequency and the plurality of signal-to-noise ratios;

the at least one gain coefficient is the at least one third gain coefficient; and the generating, based on the at least one modulation parameter and the preset gain function, of the at least one gain coefficient corresponding to the at least one modulation parameter includes:

generating, based on the plurality of signal-to-noise ratios, the plurality of frequency units, and the third gain function, a plurality of third gain coefficients corresponding to the plurality of frequency units.

20. The audio denoising method according to claim 14, wherein the obtaining of the at least one modulation parameter related to the frequency of the to-be-processed audio signal includes: obtaining at least one initial modulation parameter corresponding to the frequency of the to-be-processed audio signal, and performing smoothing processing on a value of the at least one initial modulation parameter by using the frequency as a variable to obtain the at least one modulation parameter, wherein the performing of the smoothing processing on the value of the at least one initial modulation parameter with the frequency as the variable includes: performing feature fusion processing on an initial signal-to-noise ratio corresponding to each of the plurality of frequency units and an initial signal-to-noise ratio corresponding to at least one frequency unit near a current frequency unit, to obtain a signal-to-noise ratio corresponding to the current frequency unit.

* * * * *